United States Patent [19]

Prioste

[11] 4,149,263
[45] Apr. 10, 1979

[54] PROGRAMMABLE MULTI-BIT SHIFTER

[75] Inventor: Jerry E. Prioste, Scottsdale, Ariz.

[73] Assignee: Motorola, Inc., Schaumburg, Ill.

[21] Appl. No.: 808,223

[22] Filed: Jun. 20, 1977

[51] Int. Cl.² ............................................... G06F 7/00
[52] U.S. Cl. ..................................... 364/900; 364/200
[58] Field of Search ... 364/200 MS File, 900 MS File

[56] References Cited

U.S. PATENT DOCUMENTS

| | | | |
|---|---|---|---|
| 3,133,268 | 5/1964 | Avakiah et al. | 364/900 |
| 3,887,799 | 6/1975 | Lindgren | 364/900 |
| 3,988,717 | 10/1976 | Kisyka | 364/200 |
| 3,997,771 | 12/1976 | Periowski et al. | 364/900 |

*Primary Examiner*—Gareth D. Shaw
*Assistant Examiner*—C. T. Bartz
*Attorney, Agent, or Firm*—Joe E. Barbee

[57] ABSTRACT

A versatile programmable multi-bit shifter is provided which can be built on a single monolithic integrated circuit. The shifter is capable of performing arithmetic shift left, arithmetic shift right, rotate left, rotate right, shifting right using two's complement, shifting left using two's complement, forcing the output to a predetermined logic level, or placing a sign bit at all the outputs. The programmable multi-bit shifter comprises an input data multiplexer for receiving input data and an output multiplexer coupled to the input multiplexer. The output multiplexer provides the data output for the shifter. A decoder is also provided for decoding shift function inputs. A second decoder is provided for decoding scale factor shift inputs. Outputs of the second decoder are coupled to the input data multiplexer and to the output data multiplexer and also to a sign select logic circuitry. The sign select logic circuitry combines inputs from both decoders to control operation of the output multiplexer. The shifter has reduced part count and provides high-speed implementation along with greater flexibility for the user.

10 Claims, 14 Drawing Figures

| SF3 | SF2 | SF1 | SF0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | 0 | 0 | 0 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ |
| 0 | 0 | 0 | 1 | Z | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |
| 0 | 0 | 1 | 0 | Z | Z | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 0 | 0 | 1 | 1 | Z | Z | Z | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 0 | 1 | 0 | 0 | Z | Z | Z | Z | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 0 | 1 | 0 | 1 | Z | Z | Z | Z | Z | $I_{15}$ | $I_{14}$ | $I_{13}$ | $I_{12}$ | $I_{11}$ | $I_{10}$ | $I_9$ | $I_8$ | $I_7$ | $I_6$ | $I_5$ |
| 0 | 1 | 1 | 0 | Z | Z | Z | Z | Z | Z | $I_{15}$ | $I_{14}$ | $I_{13}$ | $I_{12}$ | $I_{11}$ | $I_{10}$ | $I_9$ | $I_8$ | $I_7$ | $I_6$ |
| 0 | 1 | 1 | 1 | Z | Z | Z | Z | Z | Z | Z | $I_{15}$ | $I_{14}$ | $I_{13}$ | $I_{12}$ | $I_{11}$ | $I_{10}$ | $I_9$ | $I_8$ | $I_7$ |
| 1 | 0 | 0 | 0 | Z | Z | Z | Z | Z | Z | Z | Z | $I_{15}$ | $I_{14}$ | $I_{13}$ | $I_{12}$ | $I_{11}$ | $I_{10}$ | $I_9$ | $I_8$ |
| 1 | 0 | 0 | 1 | Z | Z | Z | Z | Z | Z | Z | Z | Z | $I_{15}$ | $I_{14}$ | $I_{13}$ | $I_{12}$ | $I_{11}$ | $I_{10}$ | $I_9$ |
| 1 | 0 | 1 | 0 | Z | Z | Z | Z | Z | Z | Z | Z | Z | Z | $I_{15}$ | $I_{14}$ | $I_{13}$ | $I_{12}$ | $I_{11}$ | $I_{10}$ |
| 1 | 0 | 1 | 1 | Z | Z | Z | Z | Z | Z | Z | Z | Z | Z | Z | $I_{15}$ | $I_{14}$ | $I_{13}$ | $I_{12}$ | $I_{11}$ |
| 1 | 1 | 0 | 0 | Z | Z | Z | Z | Z | Z | Z | Z | Z | Z | Z | Z | $I_{15}$ | $I_{14}$ | $I_{13}$ | $I_{12}$ |
| 1 | 1 | 0 | 1 | Z | Z | Z | Z | Z | Z | Z | Z | Z | Z | Z | Z | Z | $I_{15}$ | $I_{14}$ | $I_{13}$ |
| 1 | 1 | 1 | 0 | Z | Z | Z | Z | Z | Z | Z | Z | Z | Z | Z | Z | Z | Z | $I_{15}$ | $I_{14}$ |
| 1 | 1 | 1 | 1 | Z | Z | Z | Z | Z | Z | Z | Z | Z | Z | Z | Z | Z | Z | Z | $I_{15}$ |

| SF3 | SF2 | SF1 | SF0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | 0 | 0 | 0 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ |
| 0 | 0 | 0 | 1 | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ |
| 0 | 0 | 1 | 0 | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ |
| 0 | 0 | 1 | 1 | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ |
| 0 | 1 | 0 | 0 | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ |
| 0 | 1 | 0 | 1 | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ |
| 0 | 1 | 1 | 0 | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ |
| 0 | 1 | 1 | 1 | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ |
| 1 | 0 | 0 | 0 | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ |
| 1 | 0 | 0 | 1 | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ |
| 1 | 0 | 1 | 0 | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ |
| 1 | 0 | 1 | 1 | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ |
| 1 | 1 | 0 | 0 | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 1 | 1 | 0 | 1 | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 1 | 1 | 1 | 0 | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 1 | 1 | 1 | 1 | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |

| SF3 | SF2 | SF1 | SF0 | \| 15 | 14 | 13 | 12 | 11 | 10 | 9 | 8 | 7 | 6 | 5 | 4 | 3 | 2 | 1 | 0 (OUTPUT) |
|---|---|---|---|---|---|---|---|---|---|---|---|---|---|---|---|---|---|---|---|
| 0 | 0 | 0 | 0 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ |
| 0 | 0 | 0 | 1 | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |
| 0 | 0 | 1 | 0 | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 0 | 0 | 1 | 1 | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 0 | 1 | 0 | 0 | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 0 | 1 | 0 | 1 | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ |
| 0 | 1 | 1 | 0 | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ | $I_6$ |
| 0 | 1 | 1 | 1 | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ | $I_7$ |
| 1 | 0 | 0 | 0 | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ | $I_8$ |
| 1 | 0 | 0 | 1 | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ | $I_9$ |
| 1 | 0 | 1 | 0 | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ | $I_{10}$ |
| 1 | 0 | 1 | 1 | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ | $I_{11}$ |
| 1 | 1 | 0 | 0 | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ | $I_{12}$ |
| 1 | 1 | 0 | 1 | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ | $I_{13}$ |
| 1 | 1 | 1 | 0 | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ | $I_{14}$ |
| 1 | 1 | 1 | 1 | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $I_{15}$ |

| SF3 | SF2 | SF1 | SF0 | \| 15 | 14 | 13 | 12 | 11 | 10 | 9 | 8 | 7 | 6 | 5 | 4 | 3 | 2 | 1 | 0 (OUTPUT) |
|---|---|---|---|---|---|---|---|---|---|---|---|---|---|---|---|---|---|---|---|
| 0 | 0 | 0 | 0 | 1 | 1 | 1 | 1 | 1 | 1 | 1 | 1 | 1 | 1 | 1 | 1 | 1 | 1 | 1 | 1 |
| 0 | 0 | 0 | 1 | 1 | 1 | 1 | 1 | 1 | 1 | 1 | 1 | 1 | 1 | 1 | 1 | 1 | 1 | 1 | $I_{15}$ |
| 0 | 0 | 1 | 0 | 1 | 1 | 1 | 1 | 1 | 1 | 1 | 1 | 1 | 1 | 1 | 1 | 1 | 1 | $I_{15}$ | $I_{14}$ |
| 0 | 0 | 1 | 1 | 1 | 1 | 1 | 1 | 1 | 1 | 1 | 1 | 1 | 1 | 1 | 1 | 1 | $I_{15}$ | $I_{14}$ | $I_{13}$ |
| 0 | 1 | 0 | 0 | 1 | 1 | 1 | 1 | 1 | 1 | 1 | 1 | 1 | 1 | 1 | 1 | $I_{15}$ | $I_{14}$ | $I_{13}$ | $I_{12}$ |
| 0 | 1 | 0 | 1 | 1 | 1 | 1 | 1 | 1 | 1 | 1 | 1 | 1 | 1 | 1 | $I_{15}$ | $I_{14}$ | $I_{13}$ | $I_{12}$ | $I_{11}$ |
| 0 | 1 | 1 | 0 | 1 | 1 | 1 | 1 | 1 | 1 | 1 | 1 | 1 | 1 | $I_{15}$ | $I_{14}$ | $I_{13}$ | $I_{12}$ | $I_{11}$ | $I_{10}$ |
| 0 | 1 | 1 | 1 | 1 | 1 | 1 | 1 | 1 | 1 | 1 | 1 | 1 | $I_{15}$ | $I_{14}$ | $I_{13}$ | $I_{12}$ | $I_{11}$ | $I_{10}$ | $I_9$ |
| 1 | 0 | 0 | 0 | 1 | 1 | 1 | 1 | 1 | 1 | 1 | 1 | $I_{15}$ | $I_{14}$ | $I_{13}$ | $I_{12}$ | $I_{11}$ | $I_{10}$ | $I_9$ | $I_8$ |
| 1 | 0 | 0 | 1 | 1 | 1 | 1 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ |
| 1 | 0 | 1 | 0 | 1 | 1 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ |
| 1 | 0 | 1 | 1 | 1 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ |
| 1 | 1 | 0 | 0 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 1 | 1 | 0 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 1 | 1 | 1 | 0 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 1 | 1 | 1 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |

| SF3 | SF2 | SF1 | SF0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| | | | | | | | | | OUTPUT | | | | | | | | | | |
| 0 | 0 | 0 | 0 | 1 | 1 | 1 | 1 | 1 | 1 | 1 | 1 | 1 | 1 | 1 | 1 | 1 | 1 | 1 | 1 |
| 0 | 0 | 0 | 1 | $I_0$ | 1 | 1 | 1 | 1 | 1 | 1 | 1 | 1 | 1 | 1 | 1 | 1 | 1 | 1 | 1 |
| 0 | 0 | 1 | 0 | $I_1$ | $I_0$ | 1 | 1 | 1 | 1 | 1 | 1 | 1 | 1 | 1 | 1 | 1 | 1 | 1 | 1 |
| 0 | 0 | 1 | 1 | $I_2$ | $I_1$ | $I_0$ | 1 | 1 | 1 | 1 | 1 | 1 | 1 | 1 | 1 | 1 | 1 | 1 | 1 |
| 0 | 1 | 0 | 0 | $I_3$ | $I_2$ | $I_1$ | $I_0$ | 1 | 1 | 1 | 1 | 1 | 1 | 1 | 1 | 1 | 1 | 1 | 1 |
| 0 | 1 | 0 | 1 | $I_4$ | $I_3$ | $I_2$ | $I_1$ | $I_0$ | 1 | 1 | 1 | 1 | 1 | 1 | 1 | 1 | 1 | 1 | 1 |
| 0 | 1 | 1 | 0 | $I_5$ | $I_4$ | $I_3$ | $I_2$ | $I_1$ | $I_0$ | 1 | 1 | 1 | 1 | 1 | 1 | 1 | 1 | 1 | 1 |
| 0 | 1 | 1 | 1 | $I_6$ | $I_5$ | $I_4$ | $I_3$ | $I_2$ | $I_1$ | $I_0$ | 1 | 1 | 1 | 1 | 1 | 1 | 1 | 1 | 1 |
| 1 | 0 | 0 | 0 | $I_7$ | $I_6$ | $I_5$ | $I_4$ | $I_3$ | $I_2$ | $I_1$ | $I_0$ | 1 | 1 | 1 | 1 | 1 | 1 | 1 | 1 |
| 1 | 0 | 0 | 1 | $I_8$ | $I_7$ | $I_6$ | $I_5$ | $I_4$ | $I_3$ | $I_2$ | $I_1$ | $I_0$ | 1 | 1 | 1 | 1 | 1 | 1 | 1 |
| 1 | 0 | 1 | 0 | $I_9$ | $I_8$ | $I_7$ | $I_6$ | $I_5$ | $I_4$ | $I_3$ | $I_2$ | $I_1$ | $I_0$ | 1 | 1 | 1 | 1 | 1 | 1 |
| 1 | 0 | 1 | 1 | $I_{10}$ | $I_9$ | $I_8$ | $I_7$ | $I_6$ | $I_5$ | $I_4$ | $I_3$ | $I_2$ | $I_1$ | $I_0$ | 1 | 1 | 1 | 1 | 1 |
| 1 | 1 | 0 | 0 | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 1 | 1 | 1 | 1 |
| 1 | 1 | 0 | 1 | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 1 | 1 | 1 |
| 1 | 1 | 1 | 0 | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 1 | 1 |
| 1 | 1 | 1 | 1 | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 1 |

| SF3 | SF2 | SF1 | SF0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| | | | | | | | | | OUTPUT | | | | | | | | | | |
| X | X | X | X | 1 | 1 | 1 | 1 | 1 | 1 | 1 | 1 | 1 | 1 | 1 | 1 | 1 | 1 | 1 | 1 |

X = DON'T CARE

| SF3 | SF2 | SF1 | SF0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| | | | | | | | | | OUTPUT | | | | | | | | | | |
| X | X | X | X | Z | Z | Z | Z | Z | Z | Z | Z | Z | Z | Z | Z | Z | Z | Z | Z |

X = DON'T CARE

PROGRAMMABLE MULTI-BIT SHIFTER

CROSS REFERENCE TO RELATED APPLICATION

A related application is my application Ser. No. 808,221, filed 6/20/77, and assigned to the assigned to the assignee of the present application. This related application is incorporated herein by reference.

BACKGROUND OF THE INVENTION

This invention relates, in general, to digital data shifters, and more particularly, to a versatile programmable multi-bit shifter for shifting digital data in a parallel format.

In the processing of digital data and especially in digital computers it is often desirable to shift or to rotate the digital data. In the past, medium scale integration (MSI) integrated circuit chips have been used to perform these functions. However, most of these prior art MSI chips only had the capability of performing one or two functions such as a shift right or shift right and rotate function. In order to perform some of the other desirable functions, the chips had to be combined in an array. As a result, the processing time of the data was increased and in addition redundant circuitry had to used, thereby increasing the cost of the circuitry used for shifting. By now, it should be recognized that it would be desirable to solve the above and other problems.

Accordingly, it is an object of the present invention to provide an improved digital data shifter.

Another object of the present invention is to provide a programmable multi-bit shifter capable of performing arithmetic shift right and left, rotate right and left, two's complement right and left, sign extend, and output disable operations.

Yet another object of the present invention is to provide an improved programmable multi-bit shifter capable of functioning with positive or negative logic.

A further object of the present invention is to provide a multi-bit shifter having reduced parts count and high-speed implementation with greater flexibility.

SUMMARY OF THE INVENTION

In carrying out the above and other objects in one preferred form, there is provided a programmable multi-bit shifter having means for receiving digital data in parallel form and, upon command, shifting the digital data a predetermined number of positions. In addition, there is provided first means for decoding function commands for the shifter which has at least three inputs and a plurality of outputs and second means for decoding scale factor shift commands which also has a plurality of outputs. Some of the plurality of outputs of the first means for decoding are coupled to the second means for decoding. Output means for providing output data is coupled to the means for receiving. The output means is capable of controllably shifting digital data upon command. Some of the plurality of outputs of the second means for decoding are coupled to the output means to provide shifting commands to the output means while yet other of the outputs of the second means for decoding are coupled to the means for receiving to provide shifting commands to the means for receiving. The programmable multi-bit shifter is capable of performing arithmetic shift right and left, rotate right and left, two's complement right and left, sign extend, and output disable operations.

The subject matter which is regarded as the invention is particularly pointed out and distinctly claimed in the concluding portion of this specification. The invention itself, however, together with further objects and advantages thereof, may be better understood by reference to the following description taken in conjunction with accompanying drawings.

BRIEF DESCRIPTION OF THE DRAWINGS

FIG. 3 is an output truth table for an arithmetic shift right operation;

FIG. 4 is an output truth table for a left rotate operation;

FIG. 5 is an output truth table for a right rotate operation;

FIG. 6 is an output truth table for a two's complement shift right operation;

The exemplifications set out herein illustrate the preferred embodiments of the invention in one form thereof, and such exemplifications are not to be construed as limiting in any manner.

DESCRIPTION OF THE PREFERRED EMBODIMENT

Figure 1:
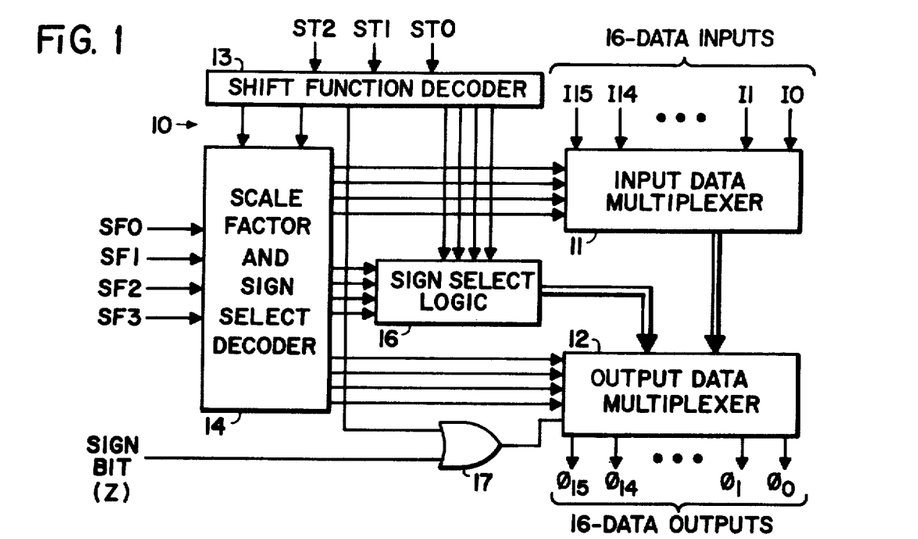
FIG. 1 illustrates, in block diagram form, the invention in one form thereof.

A programmable sixteen bit shifter 10 is illustrated in FIG. 1. Input data multiplexer 11 has sixteen data inputs labeled I0 through I15. Multiplexer 11 has sixteen outputs coupled to output data multiplexer 12. Multiplexer 12 provides sixteen data outputs for shifter 10. Shift function decoder 13 has three inputs labeled ST0, ST1, and ST2. Decoder 13 decodes the shift function commands appearing at the three inputs. The outputs of decoder 13, in conjunction with the outputs of scale factor and sign select decoder 14, are used to control the operation of multi-bit shifter 10. The outputs of decoders 13 and 14 are controlled by the inputs to the decoders. Decoder 14 has four inputs labeled SF0, SF1, SF2, and SF3. These four inputs are the scale factor inputs and specify the number of positions that the input data should be shifted or rotated. Some of the outputs of shift function decoder 13 are coupled to scale factor and sign select decoder 14. Some outputs of decoder 14 are coupled to input data multiplexer 11 and control the number of positions that multiplexer 11 will shift or rotate input data while other outputs of decoder 14 are coupled to output multiplexer 12 to control the number of positions data is shifted or rotated in multiplexer 12. Input data can be shifted zero, one, two, or three positions in multiplexer 11 while it can be shifted zero, four, eight, or twelve positions in output multiplexer 12.

Some of the outputs of decoder 14 are combined with outputs from decoder 13 in sign select logic 16 to control the direction of shifting to be performed in multiplexer 12 or to control rotation of the data when the data is to be rotated. Sign select logic 16 has sixteen outputs coupled to output data multiplexer 12. OR gate 17 receives a sign bit external from shifter 10 and has an output which is coupled to multiplexer 12. Logic gate 17 also receives an input from shift function decoder 13 which can override the sign bit input by forcing the output of gate 17 to a logic one.

The function to be performed by shifter 10 is selected by the commands appearing at the three inputs to decoder 13. The table below summarizes the shift functions in negative logic:

| Shift Function | | | |
|---|---|---|---|
| ST2 | ST1 | ST0 | Description |
| 0 | 0 | 0 | Sign bit is placed at all outputs. |
| 0 | 0 | 1 | The outputs are forced to logic ones. |
| 0 | 1 | 0 | Shift left using two's complement. |
| 0 | 1 | 1 | Shift right using two's complement. |
| 1 | 0 | 0 | Rotate right. |
| 1 | 0 | 1 | Rotate left. |
| 1 | 1 | 0 | Arithmetic shift right. |
| 1 | 1 | 1 | Arithmetic shift left. |

There are two outputs from the shift function decoder 13 which are coupled to decoder 14 and these two outputs relate to two's complements operations, one being for shifting and the other being for selecting sign. The output from decoder 13 which is connected to logic OR gate 17 is used to disable the output by forcing logic ones to all the outputs of output multiplexer 12. There are four outputs from decoder 13 which are connected to select logic 16. One of these outputs causes the sign bit appearing at the input to logic gate 17 to appear at all the outputs of output multiplexer 12. The second output from decoder 13 connected to sign select logic 16 controls the shift right operation while the third output controls the shift left operation. The fourth output inhibits the sign selection during a right or left rotate operation. The four outputs from scale factor shift and sign select decoder 14 which are coupled to input data multiplexer 11 determine whether the data multiplexer 11 is shifted or not and whether it is shifted one, two or three positions. The four outputs from decoder 14 which are coupled to output multiplexer 12 determine whether the data in the output multiplexer 12 is shifted zero, four, eight, or twelve positions. When the sign bit is placed at all the outputs, the sixteen data outputs are filled with the logic input appearing at the sign bit input and are used when performing an arithmetic shifting operation. When the command on the input of the shift function decoder 13 disables the output by forcing the sixteen data outputs to logic ones the device can be wire-ANDed to other device outputs. For a shift left using two's complement command the input data is shifted to the left at the sixteen data outputs a number of positions as selected by the two's complement of the inputs to decoder 14. The vacated bit positions are filled with negative logic ones. For a shift right using two's complement the input data is shifted to the right at the sixteen data outputs a number of positions as selected by the two's complement of the inputs to scale factor and sign select decoder 14. The vacated bit positions are filled with negative logic ones. For a rotate right command the input data is rotated to the right at the output a number of positions as selected by the binary number specified by the inputs to decoder 14. For a rotate left command the input data appears rotated to the left at the output as selected by the binary number specified by the inputs to decoder 14. For an arithmetic shift right command the input data is shifted to the right at the outputs a number of positions as selected by the binary numbers specified by the input to decoder 14. The vacated bit positions are filled with the sign bit. In other words, the vacated bit positons are filled with the logic level that appears at the sign bit input. For an arithmetic shift left command the input data appears shifted to the left at the output as selected by the binary number specified by the input to decoder 14. The vacated bit positions are filled with the sign bit. The appearance of the data at the output, as controlled by input commands to decoder 13 and 14, will become clearer by reference to the output truth tables appearing in FIGS. 2 through 9.

It should be noted that the programmable multi-bit shifter of FIG. 1 provides a versatile shifter capable of handling shift function commands that makes the device self-contained for sixteen bit digital system and yet allows shifter 10 to be completely expandable to any number of bits required for a given digital system. Only two multiplexer delays are required from data-in to data-out while the sign bit goes through a faster data path comprising an OR gate and one multiplexer. The two multiplexer delay corresponds to two gate delays in a large scale integration (LSI) implementation. Providing for the external sign bit input avoids having a slower path for the sign bit when shifter 10 is used in an array configuration. In an array configuration the sign bit must pass through an extra external gate delay. It will also be recognized that with the three bit shift function commands shifter 10 can be used with positive or negative logic systems. As an example, in the arithmetic shift left example shown above, the sign bit fills the vacated positions. In positive logic systems, the sign bit input is forced to a low voltage input which is a logic zero while in negative logic systems the sign bit is forced to a high voltage which again is a logic zero. In prior art shifters it is common for a logic zero or a logic one to be forced into the vacated positions with no other choice offered. The shift function commands also include an output disable command that forces logic ones into the outputs so that a wired AND function can be performed with other device outputs. By adding this function, it not only saves an extra logic pin but also reduces the external logic required when shifter 10 is used in an array configuration. In prior art shifters an output disable is added as an extra logic pin which also requires more external logic to implement in a shifter array. It should also be appreciated that in shifter 10 a sign extend command is provided that forces the sign bit into all the outputs. This is very useful when performing the arithmetic shift right function in large shift arrays.

Figure 2:
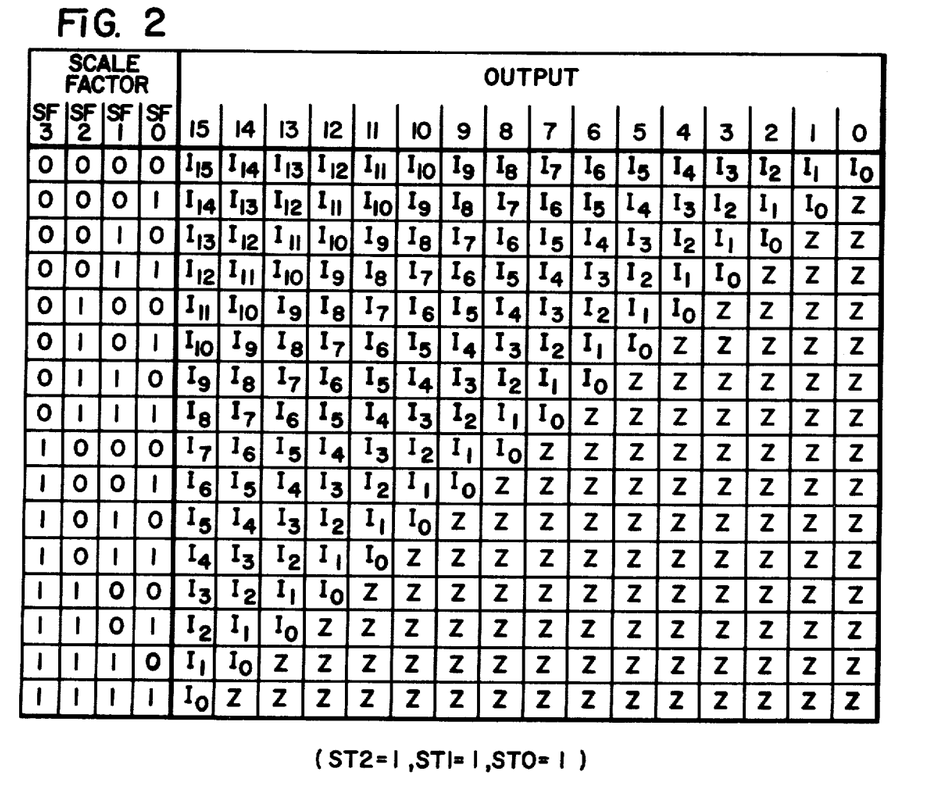
FIG. 2 is an output truth table for an arithmetic shift left operation for the embodiment of the invention illustrated in FIG. 1.

FIG. 2 illustrates an output truth table for an arithmetic shift left operation. An arithmetic shift left occurs when all three inputs ST0, ST1, ST2, of decoder 13 are logic ones. A number of positions at the input data are shifted to the left as controlled by the scale factor input appearing at the four inputs of scale factor and sign select decoder 14. In the truth table the input is illustrated as I0 through I15 while the output is illustrated as output zero through output 15. As the output data is shifted to the left, a "Z" is shown in the vacated position. This illustrates that the vacated position is filled with the logic signal appearing at the sign bit input.

The truth table shown in FIG. 3 is for an arithmetic shift right operation. The shift function command for an arithmetic shift right is logic zero for ST0 and a logic one for the ST1 and ST2 inputs for decoder 13. Here again, the scale factor inputs at SF0, SF1, SF2, and SF3 to decoder 14 control the number of positions that the data is shifted. The "Z" shown in the vacated positions indicate that the vacated positions are filled with the logic signal appearing at the sign bit input.

FIG. 4 is a truth table for a left rotate operation. The command for left rotate is a logic one at ST0, a logic zero at ST1, and a logic one at ST2 for the inputs to decoder 13. The number of positions that the data is rotated is controlled by the four inputs to scale factor shift and sign select decoder 14. The data is shifted from output zero toward output 15. The data that is shifted past output 15 is rotated back around starting at output zero.

FIG. 5 is a truth table for a right rotate command. For a right rotate command ST0 and ST1 are logic zeros while ST2 is a logic one. The number of positions that the data is shifted and rotated is controlled by the four inputs to decoder 14. The output data is shifted from output fifteen toward output zero and back around to output fifteen.

FIG. 6 is a truth table for a shift right using two's complement. For a shift right using two's complement command the inputs to decoder 13 are logic ones at ST0 and ST1 and a logic zero at ST2. The inputs to decoder 14 control the number of positions that the data is shifted to the right. The vacated positions are filled with negative logic ones. It will be noted that in two's complement when all four inputs to scale factor shift and sign select decoder 14 are logic ones the output data is shifted one position to the right.

Figure 7:
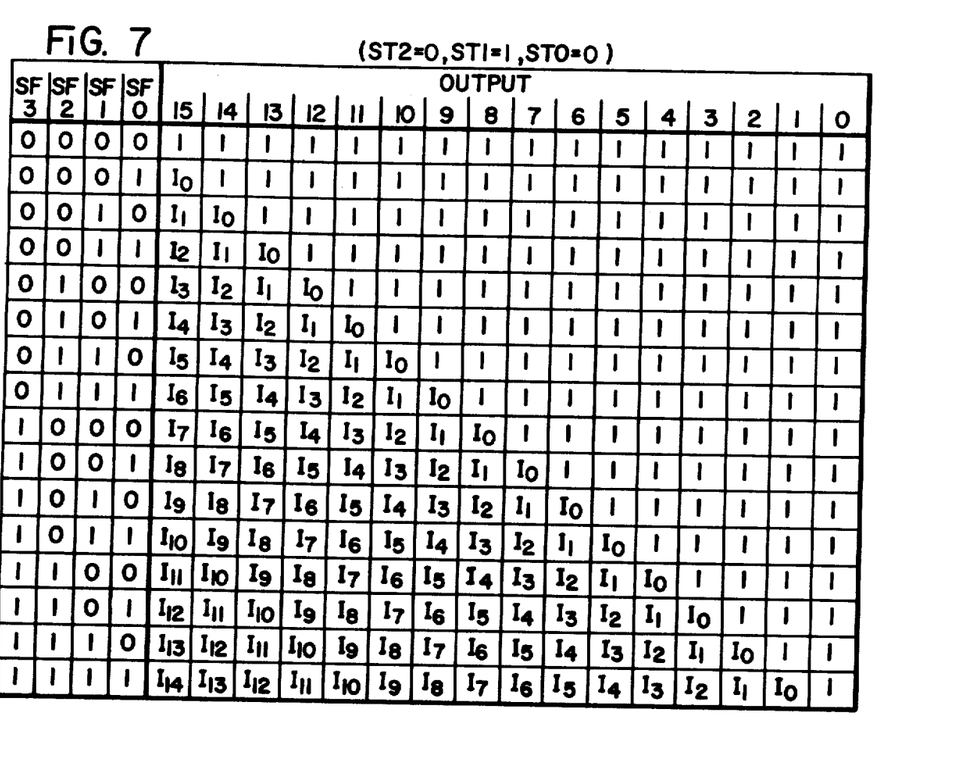
FIG. 7 is an output truth table for a two's complement shift left operation.

FIG. 7 is a truth table for a shift left using two's complement command. For a shift left using two's complement command the inputs to decoder 13 are a logic zero at ST0, a logic one at ST1, and logic zero at ST2. Here again, the number of positions that the data is shifted is controlled by the scale factor input to decoder 14. As the data is shifted left the vacated positions are filled with negative logic ones.

Figure 8:
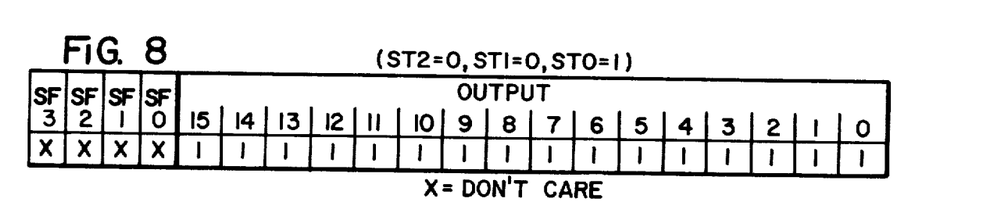
FIG. 8 is an output truth table for an output disable operation.

FIG. 8 is a truth table for an output disable command. For an output disable command the inputs to decoder 13 are logic one at ST0, a logic zero at ST1 and ST2. The outputs are all forced to logic ones for an output disable command. In this case, the four scale factor inputs to decoder 14 do not control the output data and, therefore, it does not matter what signal appears on these four inputs. In FIG. 8 these four inputs are represented by an "X" indicating that it is a "don't care" situation.

Figure 9:
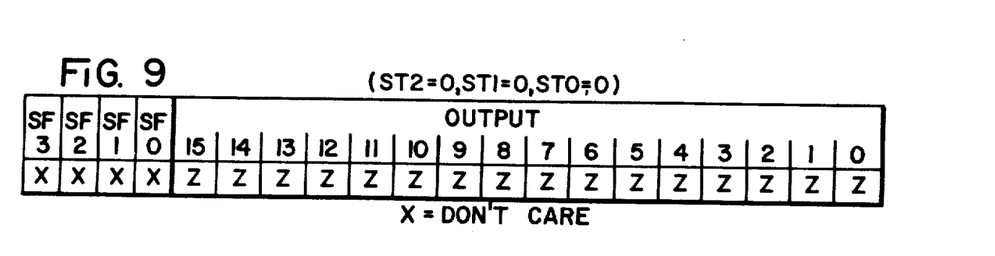
FIG. 9 is an output truth table for placing sign bits at all outputs.
Figure 10A:
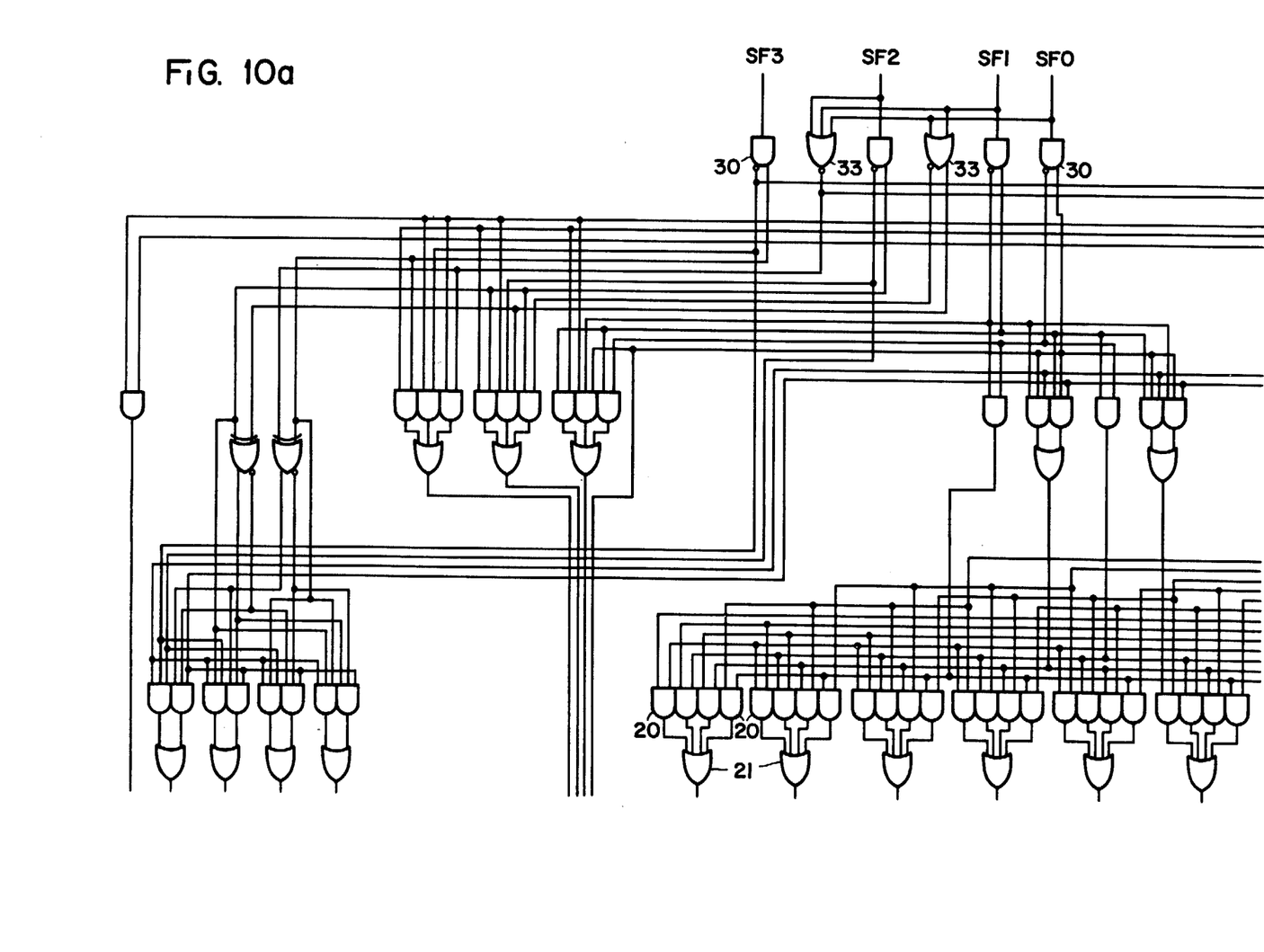
FIGS. 10a, 10b, 10c, and 10d, form a logic diagram of the embodiment of the invention illustrated in FIG. 1.
Figure 10B:
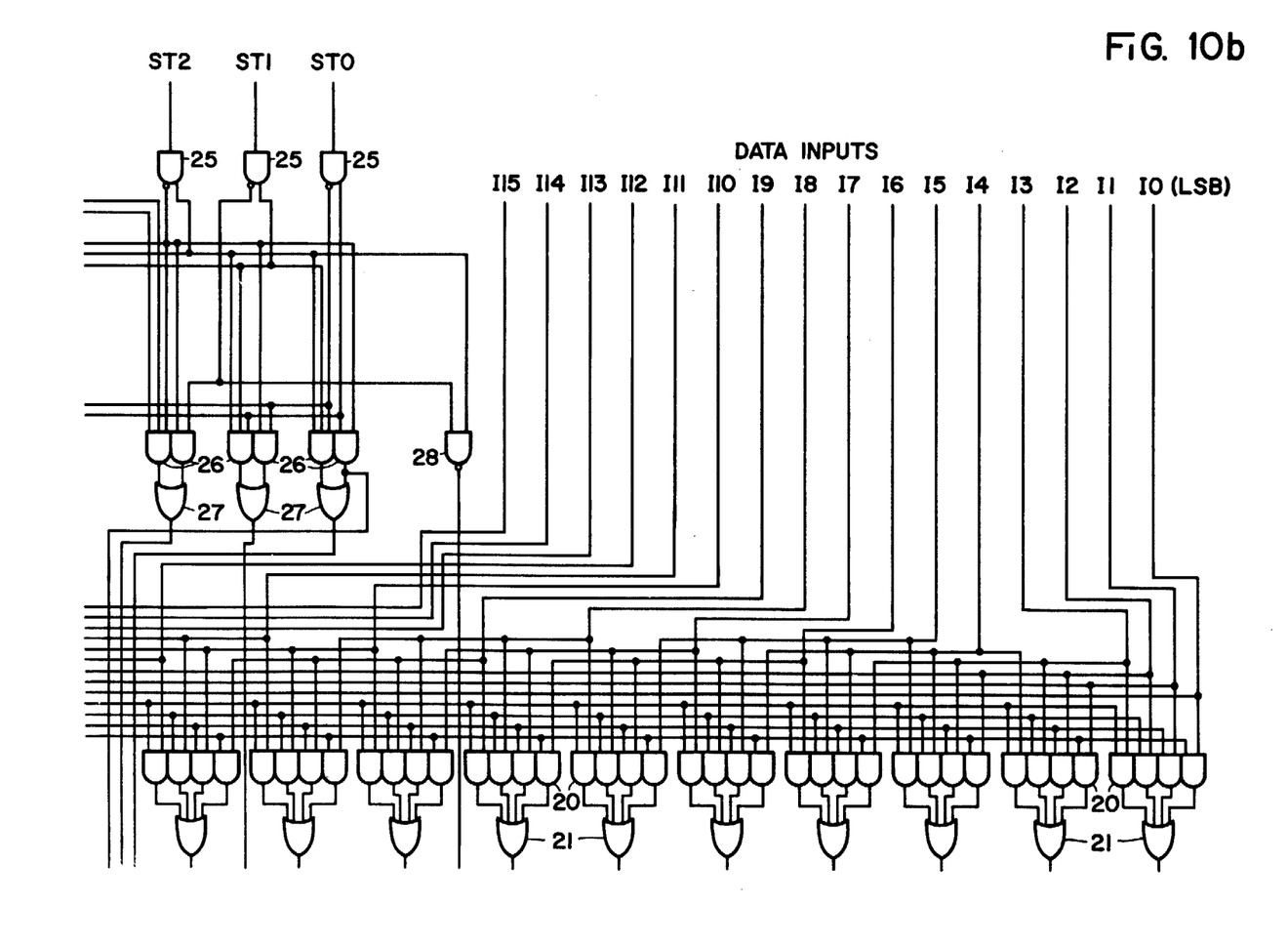
Figure 10C:
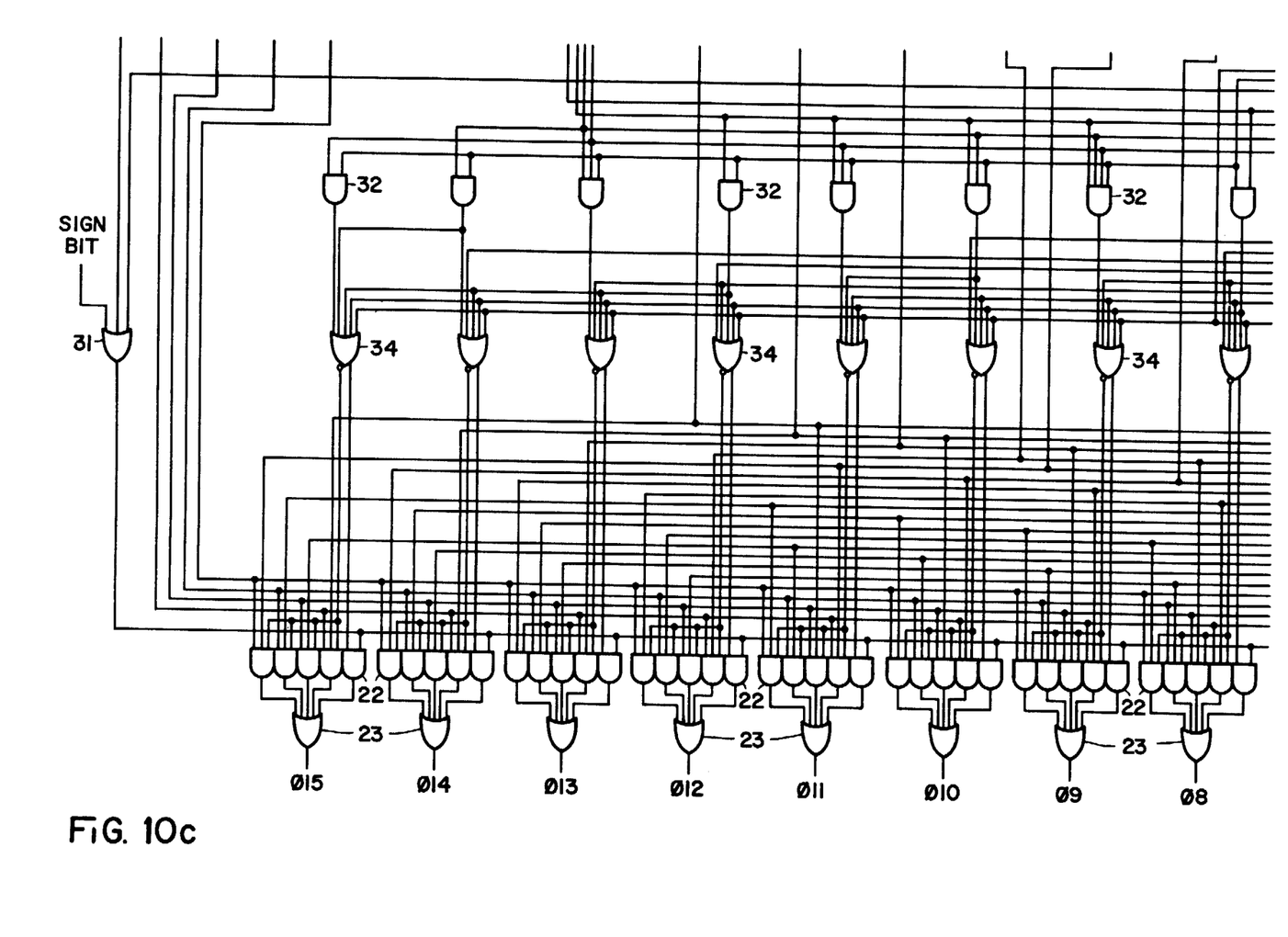
Figure 10D:
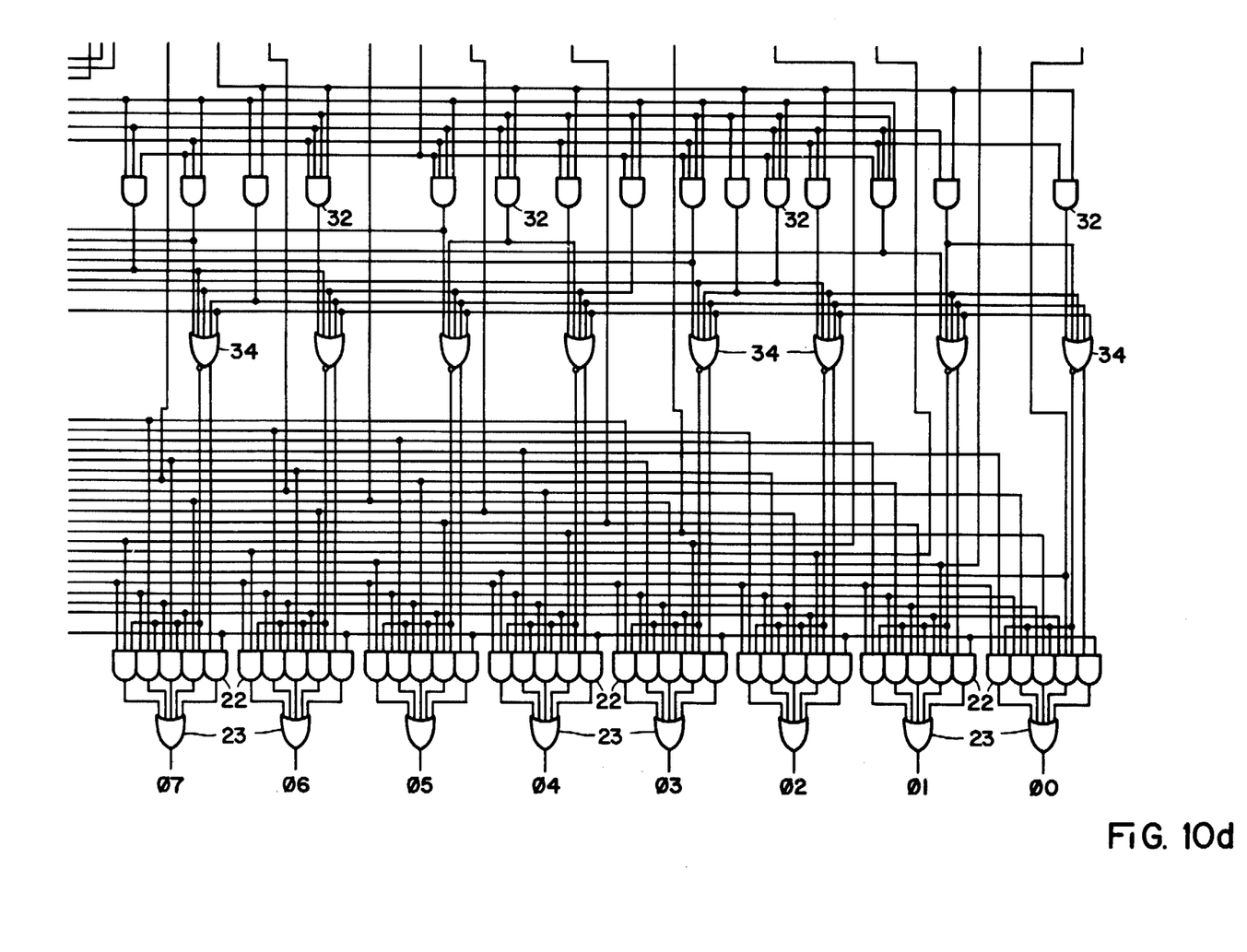

FIG. 9 is truth table for a shift function command calling for the sign bit to be placed at all the outputs. Such a command is a logic zero at ST0, ST1 and ST2 inputs of shift function select decoder 13. A "Z" is illustrated as being at the sixteen outputs indicating that whatever logic signal is present at the sign bit input will appear on the sixteen outputs. Since the four scale factor inputs do not control the output they are illustrated as an "X", once again, indicating a "don't care" situation.

FIGS. 10a, 10b, 10c, and 10d, when assembled together, form a logic diagram representation of the block diagram of FIG. 1. When assembled together, FIG. 10a becomes the top left quadrant of the diagram, FIG. 10b becomes the top right quadrant, FIG. 10c becomes the bottom left quadrant, and FIG. 10d becomes the bottom right quadrant. The interconnection between quadrants line up with each other when FIGS. 10a, 10b, 10c, and 10d are assembled together in their proper quadrants. The sixteen data inputs are connected to AND gates 20. There are sixty-four AND gates 20 which are divided into sixteen groups of four. Each group of four has its output going to inputs of an OR gate 21. There are sixteen OR gates 21. The output of OR gates 21 go to inputs of AND gates 22. There are eighty AND gates 22 divided up into groups of five. Each group of five has outputs going to an OR gate 23 thereby making a total of sixteen OR gates 23. AND gates 20 and OR gates 21 perform the function of input data multiplexer 11 of FIG. 1 while AND gates 22 and OR gates 23 perform the function of output multiplexer 12 of FIG. 1. The shift function commands ST0, ST1, and ST2 each go to a respective AND gate 25. AND gates 25 have a normal and an inverting output as will be recognized by those persons skilled in the art. Shift function decoder 13 of FIG. 1 includes AND gates 25, AND gates 26, NAND gate 28, and OR gates 27 all of FIG. 10. The four scale factor inputs SF0, SF1, SF2, and SF3 go to AND gates 30 and OR gates 33. The sign bit input goes to an OR gate 31. Sign select logic 16 of FIG. 1 includes AND gates 32 and a plurality of OR gates 34. The OR gates 34 have an inverting output along with a regular output. The sixteen bit programmable shifter illustrated in FIGS. 10a, 10b, 10c, and 10d can all be made on one monolithic integrated circuit chip. The operation of the shifter of FIG. 10 can readily be understood by those skilled in the art by reference to the truth tables of FIGS. 2 through 9.

Figure 11:
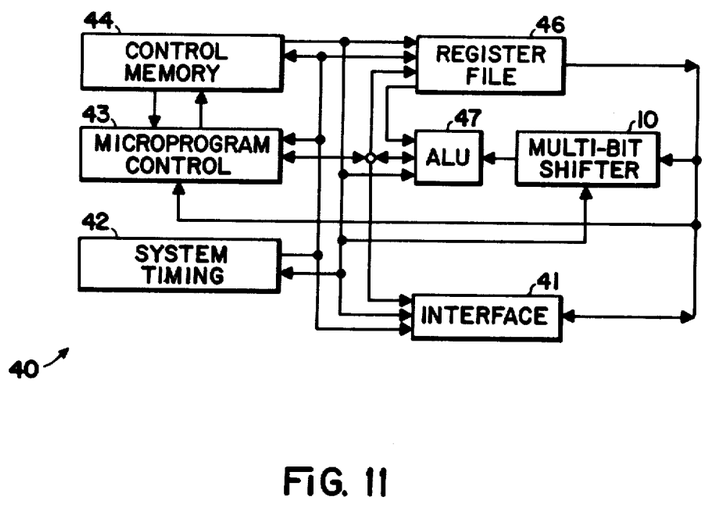
FIG. 11 is a block diagram illustrating the use of the invention in a typical system configuration.

FIG. 11 is a simplified block diagram of a typical system in which multi-bit shifter 10 can be used. An interface unit 41 is used to provide the interface from system 40 to peripheral equipment and/or external memories. The typical system 40 includes a memory 44, a microprogram control 43, and a system timing unit 42. A register file 46 along with an arithmetic logic unit (ALU) 47 is also included. Multi-bit shifter 10 is shown coupled to arithmetic logic unit 47 and it will be understood by those persons skilled in the art that shifter 10 can be on the input or the output of ALU 47.

By now it should be appreciated that there has been provided an improved, versatile, programmable multi-bit shifter capable of shifting sixteen data bits under the control of four scale factor inputs which specify the number of positions the input data should be shifted or rotated. The shifter also includes a sign bit input which is used in arithmetic shift right or left and sign extend operations. There are three shift select inputs that can be used to select one of eight appropriate shifting functions. The data outputs of the improved shifter can be disabled for wire-ANDing with other device outputs by selecting the sign bit at all the outputs and forcing the sign bit to a negative logic one. The shifter is also readily usable with positive or negative logic. This shifter can be used to provide a very fast shift network for aligning or normalizing the floating point data before entering an arithmetic logic unit or in conjunction with other computing devices.

While the present invention has been described with reference to particular embodiments and exemplifications thereof in accordance with the Patent Statutes, it is to be understood that modifications may be made by those skilled in the art without actually departing from the invention. Therefore, it is intended in the appended claims to cover all such equivalent variations as come within the spirit and scope of the invention.

What is claimed as new and desired to secure by Letters Patents of the United States is:

1. A monolithic integrated circuit programmable multi-bit shifter for performing various functions on digital information, comprising: a plurality of input logic gates for receiving input data, the plurality of input logic gates having a plurality of outputs; a second plurality of logic gates for receiving function select inputs, the second plurality of logic areas providing decoded function outputs; a third plurality of logic gates for receiving scale factor input data and providing decoded shift outputs, at least one of the function outputs being coupled to the third plurality of logic gates to modify the decoded shift outputs, some of the plurality of decoded shift outputs being coupled to the plurality of input logic gates to provide control of shifting performed by the input logic gates; a fourth plurality of logic gates coupled to the second plurality of logic gates and receiving some of the decoded function outputs, the fourth plurality of logic gates also being coupled to the thrid plurality of logic gates for receiving some of the decoded shift outputs, the fourth plurality of logic gates providing sign select outputs; and a fifth plurality of logic gates for providing output data and coupled to receive the plurality of outputs from the plurality of input logic gates, decoded shift outputs being coupled to the fifth plurality of logic gates to enable the fifth plurality of gates to shift data, and sign select outputs being coupled to the fifth plurality of logic gates to provide a shifter capable of shifting data right and left and to rotate data right and left.

2. The programmable multi-bit shifter of claim 1 further including a logic gate for receiving a sign select input signal and having an output coupled to the fifth plurality of logic gates.

3. The programmable multi-bit shifter of claim 1 having the capability of handling sixteen bits of data.

4. A programmable multi-bit shifter for shifting digital data, comprising: an input multiplexer having a plurality of inputs for receiving digital data and a plurality of outputs; a function select decoder having at least two inputs and more than two outputs, the function select decoder provides outputs to control predetermined operations within the multi-bit shifter; a scale factor shift and sign selector decoder for receiving and decoding shift information and providing a plurality of outputs, the scale factor shift and sign selector decoder being coupled to outputs of the function select decoder for receiving two's complement commands, outputs of the scale factor shift and sign selector decoder being coupled to the input multiplexer to control shifting of digital data within the input multiplexer; an output multiplexer coupled to the plurality of outputs of the input multiplexer and providing outputs equal in quantity to the plurality of inputs of the input multiplexer, outputs of the scale factor shift and sign selector decoder being coupled to the output multiplexer to control shifting of digital data within the output multiplexer; and sign select logic coupled to outputs of the function select decoder and to outputs of the scale factor shift and sign selector decoder, the sign select logic providing outputs coupled to the output multiplexer to provide control functions for the output multiplexer.

5. The programmable multi-bit shifter of claim 4 further including a sign bit input coupled to the output multiplexer for controllably providing data in predetermined output positions of the output multiplexer.

6. A digital data shifter capable of shifting left, shifting right, rotating left or rotating right digital data, comprising: means for receiving digital data in parallel from and upon command shifting the digital data a predetermined number of positions, the means for receiving having a plurality of outputs; first means for decoding function commands for the shifter and having at least three inputs and a plurality of outputs; second means for decoding scale factor shift commands and having a plurality of outputs, some of the plurality of outputs of the first means for decoding being coupled to the second means for decoding; and output means for providing output data and being coupled to the plurality of outputs of the means for receiving, the output means being capable of controllably shifting digital data, some of the plurality of outputs of the second means for decoding being coupled to the output means to provide shifting commands to the output means, some of the plurality of outputs of the second means for decoding being coupled to the means for receiving to provide shifting commands to the means for receiving.

7. The digital data shifter of claim 6 further including a plurality of logic gates having inputs coupled to some of the plurality of outputs of the first and second means and having outputs coupled to the output means to control logic operation of the output means.

8. The digital data shifter of claim 6 wherein the second means for decoding has at least four inputs.

9. The digital data shifter of claim 6 further including a logic gate having a first input for receiving sign bit information and having a second input coupled to the first means for decoding, the logic gate providing an output coupled to the output means.

10. The digital data shifter of claim 6 wherein the means for receiving digital data has sixteen inputs and the output means has sixteen outputs thereby providing a digital data shifter capable of handling sixteen bits of data in a parallel format.

* * * * *